United States Patent

[11] 3,584,943

| [72] | Inventor | Robert J. Roman<br>Rochester, N.Y. |
|---|---|---|
| [21] | Appl. No. | 772,165 |
| [22] | Filed | Oct. 31, 1968 |
| [45] | Patented | June 15, 1971 |
| [73] | Assignee | Eastman Kodak Company<br>Rochester, N.Y. |

[54] SELF-THREADING MOTION PICTURE PROJECTOR OR THE LIKE
10 Claims, 9 Drawing Figs.

[52] U.S. Cl. ................................................. 352/124, 352/158
[51] Int. Cl. ....................................................G03b 23/12, G03b 1/58
[50] Field of Search........................................... 352/158; 242/186, 192, 195; 352/124

[56] References Cited
UNITED STATES PATENTS
| 2,051,789 | 8/1936 | Foster et al. .................. | 352/158 |
| 3,429,518 | 2/1969 | McKee ......................... | 352/158 |

*Primary Examiner*—S. Clement Swisher
*Attorneys*—Robert W. Hampton and G. Herman Childress ABSTRACT: A self-threading motion picture projector is adapted to perform different functions as film is threaded, projected, partially rewound to repeat selected film sequences and automatically rewound after the entire length of available film has been displayed. A completely mechanical system includes a pivotally mounted finger for stripping the end of a carrier from the supply reel while the reel is being driven on its periphery by a pivotally mounted belt assembly. A lever actuated by an operator initiates operation of the device through interlocking and latching means to perform its above stated functions.

PATENTED JUN 15 1971

ROBERT J. ROMAN
INVENTOR.

BY J. Herman Childress
Robert W. Hampton
ATTORNEYS

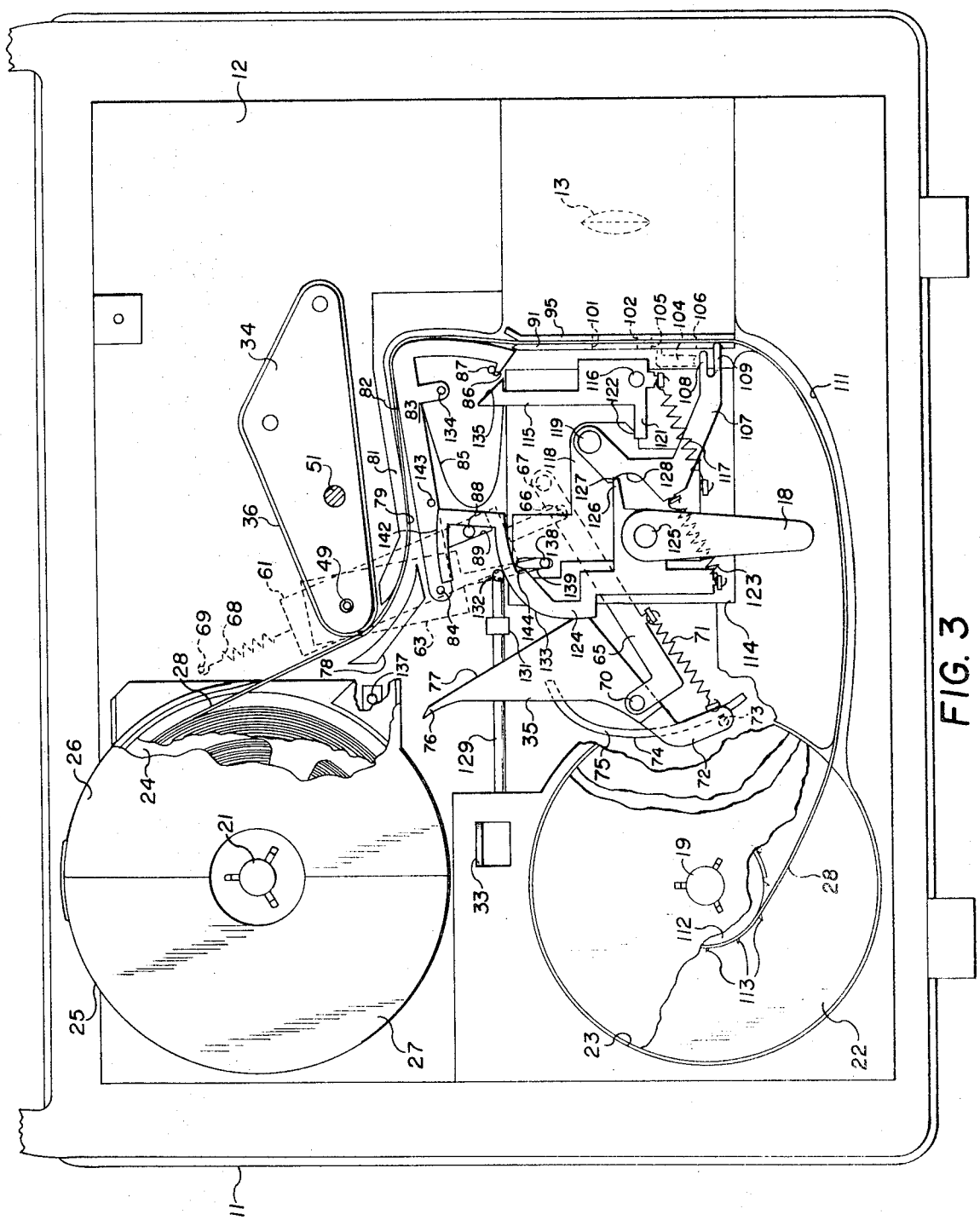

PATENTED JUN 15 1971

ROBERT J. ROMAN
INVENTOR.

BY G. Herman Childress
Robert W. Hampton
ATTORNEYS

SELF-THREADING MOTION PICTURE PROJECTOR OR THE LIKE

CROSS-REFERENCES TO RELATED APPLICATIONS

Reference is hereby made to commonly assigned U.S. Pat. application Ser. No. 643,502, entitled "Cinematographic Cartridge Projector Apparatus," filed in the names of John J. Bundschuh, Robert J. Roman and Kenneth W. Thomson on June 5, 1967; commonly assigned U.S. Pat. application Ser. No. 470,499, now U.S. Pat. No. 3,429,518 entitled "Automatic Film Stripper," filed in the name of Edward S. McKee on July 8, 1965; commonly assigned U.S. Pat. application Ser. No. 643,503, entitled "Cartridge for Reel of Strip Material," filed in the names of John J. Bundschuh and Kenneth W. Thomson on June 5, 1967; commonly assigned U.S. Pat. application Ser. No. 685,588, now abandoned, entitled "Cartridge," filed in the name of John J. Bundschuh, on Nov. 24, 1967; and commonly assigned U.S. Pat. application Ser. No. 685,616, entitled "Cinematographic Projectors or the Like and Cartridges for Use Therein," filed in the names of John J. Bundschuh and Robert J. Roman on Nov. 24, 1967.

BACKGROUND OF THE INVENTION

1. Field of the Invention

The present invention relates principally to motion picture projectors or related devices such as tape recorders, and more particularly to cartridge loaded self-threading projectors adapted to function in different modes of operation during a threading cycle, a projection cycle, a review cycle and an automatic rewind cycle.

2. Description of the Prior Art

Self-threading cartridge loaded motion picture projectors representative of the type of equipment to which the present invention relates are disclosed in commonly assigned U.S. Pat. application Ser. No. 643,502, entitled "Cinematographic Cartridge Projector Apparatus," filed in the names of John J. Bundschuh, Robert J. Roman and Kenneth W. Thomson on June 5, 1967, and in commonly assigned U.S. Pat. application Ser. No. 685,616, entitled "Cinematographic Projectors or the Like and Cartridges for use Therewith," filed in the names of John J. Bundschuh and Robert J. Roman on Nov. 24, 1967. After a film supply cartridge has been installed in an operative position on such a projector, movable elements of a film stripping and threading mechanism enter an opening in the cartridge and engage the film roll therein to withdraw the leading end of the film from the cartridge and to direct it along a predetermined threading path. As the leading end of the film moves along this path under the influence of the stripping and threading mechanism, it passes through the projector film gate and into engageable relation with the projector's film advancing mechanism, beyond which it is attached automatically to a takeup reel. Further details and features of this general type of film stripping and threading mechanism and of film supply cartridges adapted for use therewith are also disclosed in related commonly assigned U.S. Pat. applications Ser. Nos. 470,499, entitled "Automatic Film Stripper," filed in the name of Edward S. McKee on July 8, 1965; 643,503, entitled "Cartridge for Reel of Strip Material," filed in the names of John J. Bundschuh and Kenneth W. Thomson on June 5, 1967; and 685,588, entitled "Cartridge," filed in the names of John J. Bundschuh and Robert J. Roman on Nov. 24, 1967.

After the threading operation has been completed, the movable elements of the stripping and threading mechanism are withdrawn from engagement with the film supply roll and the film is displayed as it is moved through the film gate by the film advancing mechanism. The trailing end of the film is attached to the film supply reel within the cartridge so that it cannot separate therefrom. Consequently, when all of the film has been unwound from the supply reel, the film advancing mechanism applies maximum tension to the trailing portion of the film. During the film threading operation, a movable spring-loaded snubber member is held in a fixed position in which it defines a curved portion of the film threading path. Upon completion of the threading operation, however, the snubber member is released so that it can yield in response to variations in film tension. In addition to absorbing minor film tension fluctuations, this snubber member is adapted to adjust the reel driving system to initiate the rewinding operation when the film tension increases sufficiently to indicate that all of the film has been unwound from the supply reel; thereby causing the film to be rewound into the cartridge. Concurrently, the film gate is also opened to allow the film to move freely through the gate from the takeup reel to the supply reel without being engaged by the film advancing mechanism. Subsequently, the various operative elements of the projector are readjusted automatically to enable the next stripping and threading operation to be performed in the same manner after the cartridge has been removed or replaced. A related projector mechanism employing a movable snubber member to initiate a film rewinding operation is also disclosed in commonly assigned U.S. Pat. No. 3,300,155, issued in the name of Robert J. Roman on Jan. 24, 1967, but does not include means for blocking the snubber member during a film threading operation or for readjusting the mechanism automatically to perform the next threading operation.

In order to coordinate the adjustment of the film stripping and threading mechanism, the reel drive system and the mechanism employed to open the film gate, both of the above-described projectors include control systems comprising a plurality of unitarily rotatable power driven cams which produce the required movements of the various projector elements as the cams rotate intermittently through successive angular increments. The successive movements of these cams, in turn, are regulated by a timing system comprising electric sensing switches, electrically operated clutches, solenoid devices, etc.

In addition to the features described above, both of the aforementioned projectors also include means for manually initiating the rewind operation and for restoring the projection operation before the film has been completely rewound, thus allowing any selected portion of the film to be reviewed. Also, if desired, either of those projectors can be adapted to project film in a reverse direction. Furthermore, both of such power operated control systems incorporate means for performing unconventional operations which are novel to the particular projectors involved. More specifically, the projector described in Pat. application No. 643,502 is adapted to display automatically a number of different cartridges in sequence under the control of additional cam members incorporated in its control system; whereas the control system of the projector described in Pat. application No. 685,616 is adjustable to two different modes of operation to enable that projector to be loaded either with film cartridges or with conventional film reels.

SUMMARY OF THE INVENTION

Although the power operated control systems of the above-described projectors are highly suitable for such relatively complex machines, the inherent cost of the various electrical components, reduction gearing, clutch arrangements, and the like involved in such systems make them unnecessary for simpler types of self-threaded projectors, particularly for projectors adapted to be loaded manually only with a particular type of film cartridge. Accordingly, the present invention is directed to providing a simplified and relatively inexpensive manually powered control system which automatically adjusts and coordinates the operations of the projector during the threading, projection, review and automatic rewind modes of operation thereof.

Briefly, in accordance with the present invention, a motion picture projector having means for supporting a roll of strip material having a leading end is provided with a film stripping mechanism which is manually moved into and out of engagement with the roll of strip material. The mechanism, when in engagement with the roll, is operative to drive the roll in an unwinding direction and to lift the leading end of the strip material from the roll. The mechanism has portions which form a guide for the leading end of the strip material after it has been lifted from the roll.

BRIEF DESCRIPTION OF THE DRAWINGS

In the drawings:

FIG. 3 is a partial side elevational view of the projector shown in FIG. 1 with the mechanism cover plate and the lens housing removed to illustrate internal components of the projector including the manually powered control system embodied therein;

DESCRIPTION OF THE ILLUSTRATIVE PREFERRED EMBODIMENT

Figure 1:
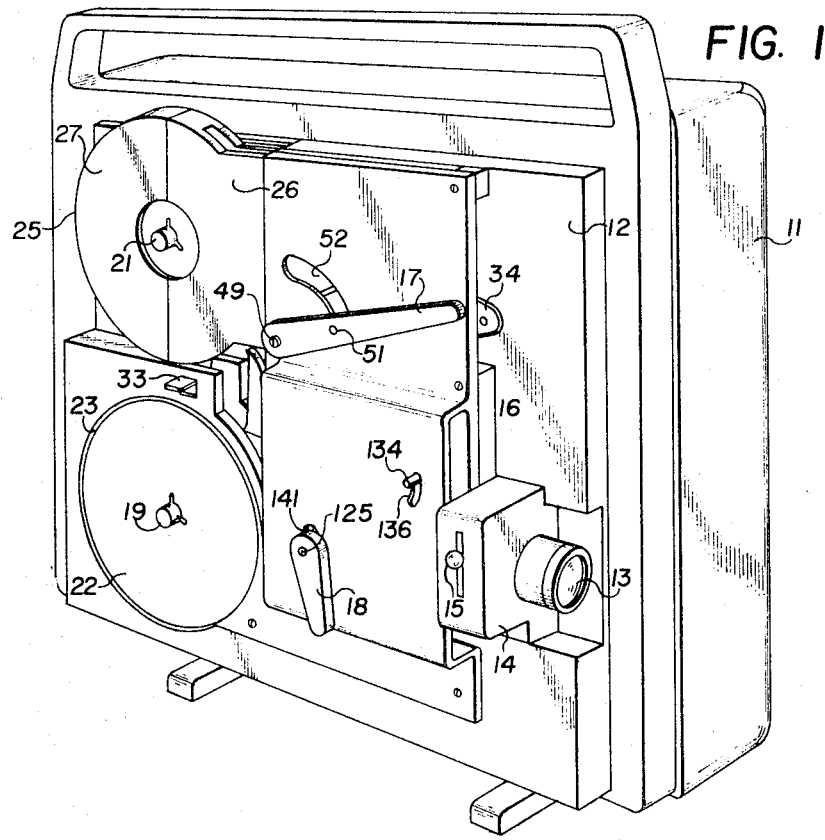
FIG. 1 is a perspective view of a cartridge loaded self-threading motion picture projector according to a preferred embodiment of the invention.

By reference to FIG. 1 of the drawings, it will be seen that the illustrated projector comprises a generally rectilinear external casing member 11 attached to a vertical frame plate 12 which supports the various operative projector components. A projection lens assembly 13 is mounted to the frame plate by a housing 14 and is adapted to be adjusted along its axis for focusing in a conventional manner by means of vertically movable focusing Knob 15. Along the central portion of the frame plate, a cover plate 16 is attached thereto behind manually movable threading lever 17 and manually movable review handle 18, both of which can be removed from their respective support shafts to allow removal of the cover plate. Toward the end of the frame plate opposite the lens assembly, a pair of splined horizontal reel drive spindles shown at 19 and 21 extend through that plate. A film takeup reel 22 is mounted on the lower reel spindle 19 within a substantially continuous cylindrical recess 23 in the frame plate; whereas the upper reel spindle 21 is adapted to rotatably support a film supply reel 24 located within a film cartridge 25 releasably mounted to the frame plate.

Figure 2:
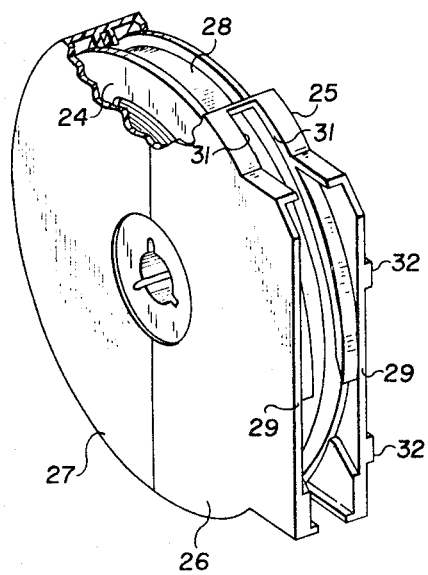
FIG. 2 is a perspective view of a film cartridge of the type adapted to be used with the projector shown in FIG. 1, with portions of the cartridge structure depicted broken away to illustrate internal details thereof.

Film supply cartridge 25, per se, is best illustrated in FIG. 2 and is further depicted and described in the above-identified commonly assigned U.S. Pat. applications Ser. Nos. 470,099, 643,502, and 643,503. As shown respectively at 26 and 27, the cartridge includes a base member and a cover member which are attached separately to each other to define a generally cylindrical internal chamber adapted to accommodate the film supply reel 24 carrying a roll of film 28. The portion of the cartridge body member opposite the cover member extends outwardly to define flat support surfaces 29 at opposite sides of a semicircumferential slot 31 which provides access to the film wound onto the supply reel within the cartridge. As disclosed in the previously identified commonly assigned U.S. Pat application Ser. No. 685,616, the cartridge is adapted to be positioned on the projector in the loaded position shown in FIG. 1 by the reception of the cartridge ribs partially shown at 32 in corresponding grooves in the projector frame plate. A releasable latching mechanism, not shown, also engages ribs 32 to retain the cartridge in its loaded position until that mechanism is released by means of manually movable latch release ear 33 to allow the cartridge to be removed from the projector.

Figure 5:
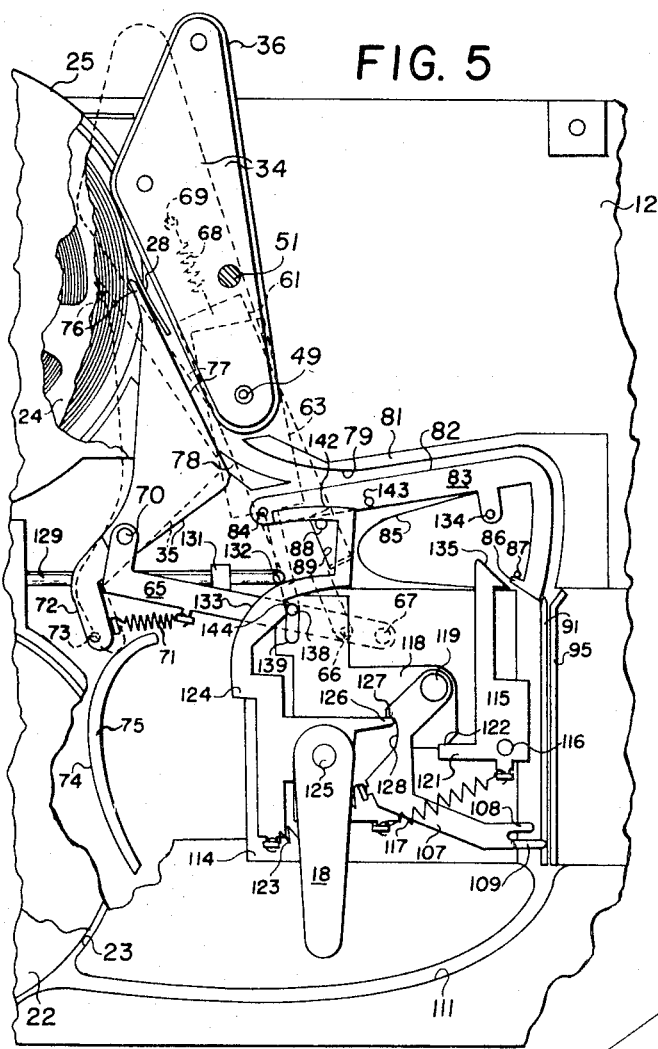
FIG. 5 corresponds to a portion of FIG. 3 and illustrates the film driving belt member and the film stripper finger of the stripping and threading mechanism in engagement with a roll of film housed within the film supply cartridge.
Figure 4:
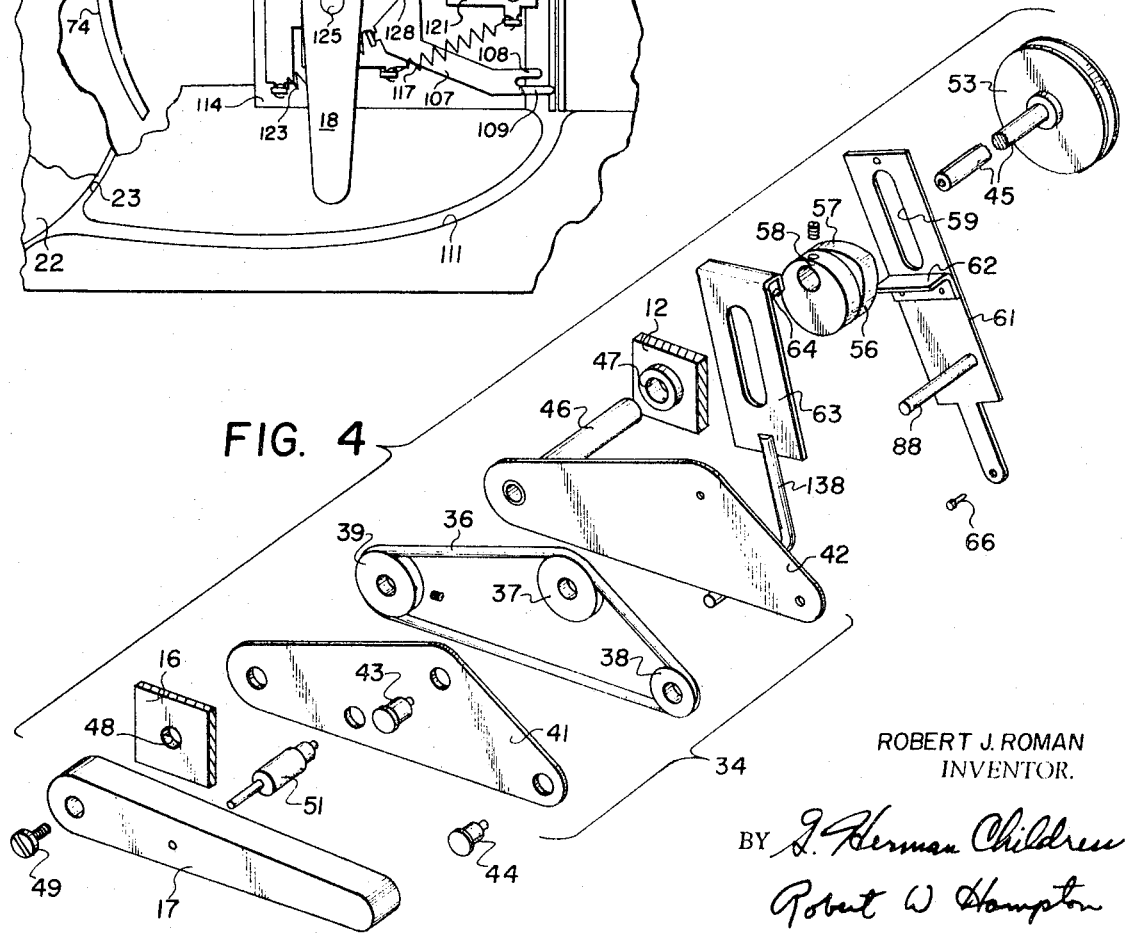
FIG. 4 is an exploded perspective view of the film driving belt assembly included in the film stripping and threading mechanism of the subject projector.

The film stripping and threading mechanism of the subject projector is best depicted in FIGS. 3, 4 and 5 and comprises a film driving belt member 34 and a stripper finger 35. As shown in greatest detail in FIG. 4, member 34 includes an endless elastic drive belt 36 of circular cross section surrounding three pulleys, 37, 38 and 39, which are supported in coplanar relation to one another between sideplates 41 and 42. Pulleys 37 and 38 are freely rotatable about their respective pivot studs 43 and 44, whereas pulley 39 is attached to drive shaft 45 rotatably received within support tube 46 extending rearwardly from sideplate 42. The support tube and the forward end of the drive shaft are journaled respectively in holes 47 and 48 in frame plate 12 and cover plate 16. Beyond the cover plate, threading lever 17 is pivotally retained on the drive shaft by means of screw 49 and is attached to sideplate 41 by a shoulder pin 51 extending through slot 52 in the cover plate. By this means, the drive belt member can be pivoted about the axis of drive shaft 45 by threading lever 17 between the positions shown in FIGS. 3 and 5, independently of the rotation of the drive shaft. A driving pulley 53, attached to the end of the drive shaft opposite lever 17, is belted to a drive motor, not shown, so that the drive shaft and the drive belt revolve continuously in a counterclockwise direction as viewed in the drawings regardless of the angular position of the film driving belt member.

A cam member 56 comprising lobes 57 and 58 is mounted securely on support tube 46 and therefore rotates with the drive belt member in response to corresponding angular movement of threading lever 17. Between cam member 56 and pulley 53, support tube 46 extends through an elongate slot 59 in a stripper control cam follower member 61, which is provided with a cam follower lip 62 engageable by the lower surface of cam lobe 57. A similar reset cam follower member 63, the function of which will be described later, is also provided along the support tube with its cam follower lip 64 located above and in engageable contact with cam lobe 58. At its lower end, cam follower member 61 is pivotally attached to stripper finger support arm 65 by pin 66 located adjacent the end of that arm pivotally attached to the frame plate by stud 67. A coil spring 68 is tensioned between the upper end of cam follower member 61 and a stationary pin 69 on the frame plate, thereby urging the cam follower lip 62 upwardly into contact with cam lobe 57. Stripper finger 35 is pivotally attached to the free end of arm 65 by a pivot stud 70 and is biased in a counterclockwise direction relative to that arm by a spring 71 tensioned between the arm and the downwardly projecting leg of the stripper finger shown at 72. Also attached to leg 72 of the stripper finger is a cam follower pin 73 which engages a fixed cam surface 74 defined by a raised boss 75 on the frame plate, thereby defining an angular relation between the stripper finger and arm 65.

When a film cartridge is first loaded onto the projector, the drive belt member is positioned as shown in FIG. 3 by virtue of the corresponding position of threading lever 17. Therefore, as shown in FIG. 4, cam lobe 57 maintains cam follower member 61 in its lowermost position so that the stripper finger also is located as shown in FIG. 3. At this stage of the projector's operating cycle the upper reel spindle is rotating rapidly in a rewinding direction, whereas the lower reel is in a freely rotatable condition. Consequently, the rapid rewinding rotation of the film supply reel within the film cartridge tends to wind the film roll tightly thereon by absorbing any clockspringing of the film convolutions that may have occurred during the preceeding storage and handling of the cartridge.

As threading lever 17 is moved manually in a counterclockwise direction, the drive belt member moves therewith as cam lobe 57 simultaneously allows spring 68 to raise the free end of arm 65 and the stripper finger attached thereto. Before the drive belt engages the film roll as shown in FIG. 5, however, a reel drive clutch system is adjusted, as described however, a reel drive clutch system is adjusted, as described later, so that the film supply reel is now freely rotatable while the takeup reel is frictionally rotated in a clockwise film winding direction. The profile of cam lobe 57 is such that arm 65 reaches its uppermost position before the drive belt member has moved into contact with the film roll. As arm 65 approached its uppermost position, cam follower pin 73 on the stripper finger moves beyond engagement with cam surface 74, thereby allowing the pointed tooth 76 of the stripper to engage the film roll with the substantially straight upper edge 77 of the finger in generally tangential relation to the roll. Upon engagement of the drive belt with the film roll, the counterclockwise movement of the belt imparts clockwise rotation to the film roll and the reel on which it is wound; causing the leading end of the film to be separated from the roll by the stripper finger and to emerge from the cartridge between edge 77 of the finger and the adjacent straight portion of the belt. If the film roll is smaller than that depicted in the drawings, the stripper finger and the belt member simply move further into the cartridge to perform in the same manner, as represented in broken lines in FIG. 5.

Toward the lower end of the portion of the film path defined between the drive belt and the stripper finger, the corners of the leading end of the film encounter a guide member 78 projecting outwardly from the frame plate and a corresponding guide member, not shown, which is provided on cover plate 16. These two guide members straddle the stripper finger to direct the film between a stationary curved guide surface 79, defined by film guide boss 81 on the frame plate, and the similarly curved upper surface 82 of snubber member 83. The latter member is pivotally mounted to the frame plate by rivet 84 and is urged upwardly by a light leaf spring 85 to its illustrated raised position in which a tooth 86 on the snubber member is in abutment with stationary stop pin 87. Throughout the threading operation, however, the snubber member is held positively in its depicted uppermost position by pin 88 on the raised cam follower member 61, which projects through rectangular opening 89 in the frame plate and abuts against the lower edge of the snubber member. Alternatively, it may be desirable to incorporate a relatively strong spring between the cam follower member and the snubber member so that the latter also is yieldable downwardly while the cam follower member is raised, but only in opposition to a resilient upward force substantially greater than that produced by spring 85 alone when the cam follower member is lowered.

Figure 6:
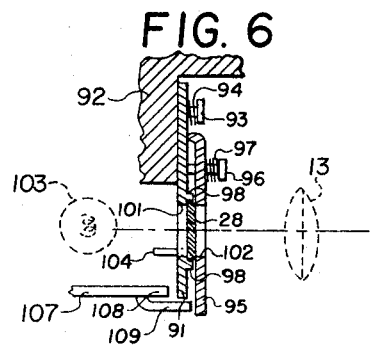
FIG. 6 is a cross-sectional top view of the film gate in its closed condition.
Figure 7:
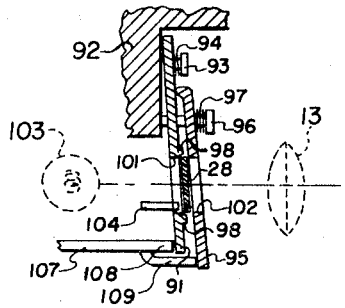
FIG. 7 corresponds to FIG. 6 and illustrates the film gate in its open condition.

Directly below the lower end of the portion of the film path established between film guide boss 81 and the raised snubber member, the projector is provided with a generally conventional film gate structure of the type described in the aforementioned commonly assigned U.S. Pat. No. 3,300,155. As depicted in greatest detail in FIGS. 6 and 7, this gate structure comprises an aperture plate 91 attached to a shoulder 92 of the frame plate by vertically aligned mounting rivets 93 and urged to the position shown in FIG. 6 by springs 94 beneath the heads of the mounting rivets. A pressure plate 95 is similarly attached to the aperture plate by rivets 96 and is urged resiliently toward the latter plate by springs 97. Accordingly, when the gate is closed as shown in FIG. 6, the film received therein between guide ribs 98 is sandwiched between the two gate plates as it is moved past aligned apertures 101 and 102 along the optical axis of the lens assembly and in alignment with a conventional light source represented in FIGS. 6 and 7 by lamp 103. A conventional film pulldown claw, partially shown at 104 in FIGS. 3, 6 and 7, is adapted to move into and out of engagement with the film passageways through slots 105 and 106 in the two gate plates (FIG. 3), to move the film intermittently through the gate in the manner well known in the projector art. As will be explained in greater detail below, the gate is adapted to be opened as shown in FIG. 7 by a gate opening lever 107 including fingers 108 and 109, which respectively rock the aperture plate toward the lens system and rock the pressure plate in the same direction relative to the aperture plate, thus releasing the pressure on the film and moving it beyond the path of movement of the pulldown claw.

When the leading end of the film strip moves downwardly past the lower end of the snubber member during the threading operation, it enters the gate with sufficient force to push the film along the film passageway therein even though the gate is in its closed condition, thereby bringing the film into engagement with the moving pulldown claw which thereafter continues to advance it through the gate. To assist the film in entering the gate, supplemental means, not shown, also can be provided to separate the aperture and pressure plates slightly while this operation is being performed. Upon emerging from the gate, the leading end of the film then enters a curved lower guide channel 111 in the frame plate, by which it is guided between the flanges of the takeup reel. The hub 112 of the latter reel is provided with a plurality of teeth 113 or with equivalent known means whereby the film becomes attached automatically to the reel, thus completing the threading operation.

As soon as the film has become engaged by the film pulldown claw, the driving belt member has served its purpose and is moved back to the position shown in FIG. 3, either manually or by means of a spring, not shown, which is adapted to return the drive belt member to that portion when the threading lever is released. Consequently, cam follower member 61 now moves downwardly to return the stripper finger to its inoperative position and to move pin 88 out of contact with the snubber member so that the latter can now pivot downwardly against the influence of spring 85.

Below the snubber member, a mechanism plate 114 is immovably attached to the frame plate. A trigger lever 115 is pivotally connected to the mechanism plate by pivot stud 116 and is connected by a spring 117 to a movable support plate 118 similarly pivoted to the mechanism plate by another pivot stud 119. Spring 117 therefore biases the trigger lever and the movable support plate in opposite directions about their respective pivot axis. As long as latch tooth 121 of the trigger lever is received in notch 122 of the support plate, however, those two elements remain in their respective positions shown in FIG. 3. Gate opening lever 107 also is pivotally attached to the mechanism plate by pivot stud 119 and is connected by spring 123 to interlock lever 124, which is mounted on shaft 125 rotatably carried by the support plate 118. The gate operating lever and the interlock lever, therefore, are likewise resiliently biased in opposite rotational directions to their respective positions illustrated in FIG. 3, in which tongue 126 on the interlock lever is engaged with a shoulder 127 at the upper end of cam surface 128 on the gate opening lever.

As long as the various components mounted to the mechanism plate are disposed as represented in FIG. 3, i.e. throughout the threading and projection phases of the projector's operation, fingers 108 and 109 of the gate opening lever are out of contact with the two gate plates as shown in FIGS. 3 and 6, thereby allowing the gate to remain closed. Also, the reel driving system is maintained in the condition in which the supply reel is freely rotatable while the takeup reel is frictionally driven in a winding direction to absorb the film delivered through the gate by the pulldown claw. To accomplish the latter function, the projector is provided with a shift mechanism, not shown, similar to the one described in commonly assigned U.S. Pat. No. 3,300,155. This mechanism includes a shifting rod 129 supported for rotational movement about the horizontal axis of the longitudinal portion of the rod received in support bushing 131. Whenever the rod is rotatably positioned so that its transverse end portion 132 is generally horizontal as shown in FIGS. 3 and 5, the drive system is thereby adjusted to the condition just described. However, if that end of the rod is allowed to be moved downwardly by a spring, not shown, the corresponding rotational movement of the rod causes the system to be shifted to that the supply reel is driven positively in a rewinding direction while the takeup reel rotates freely. As long as the interlock lever is oriented as shown in FIGS. 3 and 5, the transverse end portion of the shifting rod is held in the above-described horizontal position by engagement with cam surface 133 of that lever, thus maintaining the reel drive system in its threading and projection mode of operation.

When all of the available film has been projected, the tension developed in the trailing end of the film causes the snubber member to pivot downwardly against the influence of spring 85. This movement of the snubber member causes a pin 134 projecting horizontally therefrom to engage the sloped edge surface 135 of the trigger member and to move that lever in a counterclockwise direction so that latch tooth 121 is disengaged from notch 122 in the support plate. As a result, spring 117 now moves the support plate in a counterclockwise direction about pivot stud 119 to the position shown in FIG. 8. Such movement of the support plate is accompanied by a corresponding movement of the gate opening lever and the interlock lever, which remain immovable relative to the support plate due to the continuing engagement of tongue 126 of the interlock lever with the support plate shoulder 127. Hence, fingers 108 and 109 of the gate opening lever now engage the respective edges of aperture plate 91 and pressure plate 95 to open the gate. Concurrently, the movement of the interlock lever displaces cam surface 133 thereof so that the end portion of the shifter bar now moves downwardly to shift the reel drive system to its rewind mode of operation. Therefore, the film now is rewound automatically through the open gate back into the supply reel within the film cartridge. Pin 134 extends through a slot 136 in cover plate 16, as shown in FIG. 1, thereby allowing the automatic rewind mode of operation to be initiated by manual downward movement of that pin if the operator should wish to rewind the film entirely into the film cartridge before the projection of the film has been completed.

Figure 8:
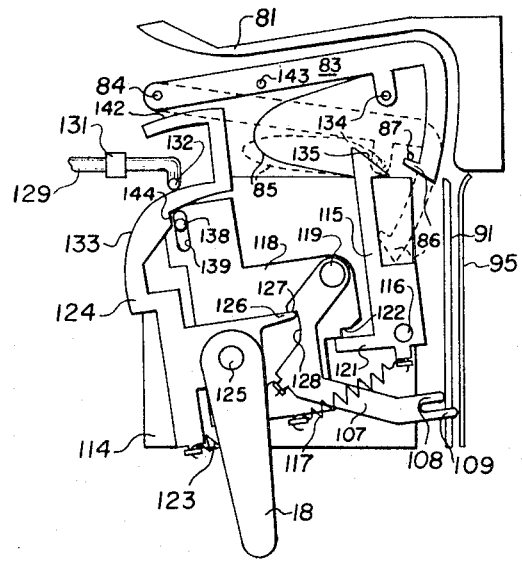
FIG. 8 corresponds to a portion of FIG. 3 and depicts the respective positions of the various illustrated elements of the control system when that system has been adjusted automatically to rewind the entire length of film into the film supply cartridge and FIG. 9 corresponds to FIG. 8 and shows the respective positions of the various illustrated elements of the control system when that system is manually adjusted to rewind a portion of the film so that a selected film sequence can be reviewed.
Figure 9:
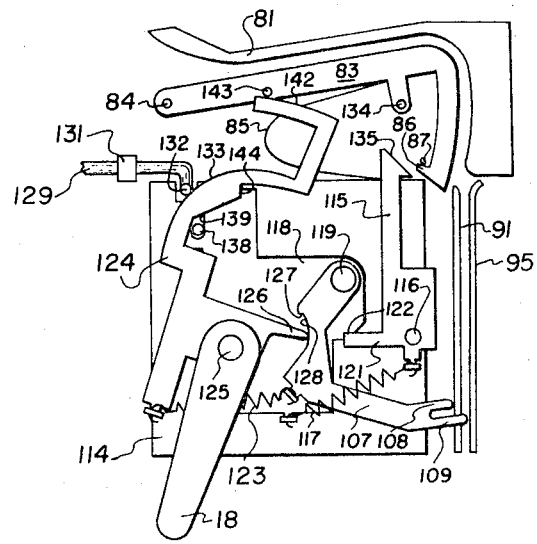

Following the completion of the rewinding operation, the film cartridge is released by manual movement of the latch release ear 33 and is removed from the projector. To facilitate installing the next cartridge, the motor which drives the reel spindles and the film advancing mechanism is connected with a switch 137 shown in FIG. 3, which turns the motor off except when that switch is closed by engagement with a film cartridge installed on the projector. Upon installation of a new film cartridge, the projector still is adjusted to its rewind mode of operation, whereby the film reel initially is rotated in a rewinding direction as previously mentioned. Before the stripping and threading operation can be accomplished, however, the various operative elements of the projector must be readjusted accordingly. For this purpose, the previously mentioned reset cam follower member 63 associated with lobe 58 of cam member 56 is provided at its lower end with a bent reset rod 138 extending through a slot 139 in the support plate and projecting below the arcuate portion of the interlock lever which defines cam surface 133. Whenever threading lever 17 is in its generally horizontal position, i.e. except during the performance of the stripping and threading operation, the reset cam follower member 63 remains in the lowered position. Therefore, the horizontal lower portion of the reset rod is located below the upper end of slot 139, as shown in FIGS. 3, 8 and 9, and in no way influences the operation of the projector. When lever 17 is moved out of its inoperative position to initiate the film stripping and threading operation, however, the reset cam follower member is raised by cam lobe 58 so that the lower portion of the reset rod moves temporarily upwardly in slot 139, as shown in FIG. 5. In so doing, the reset rod engages the upper end of slot 139 and thereby pivots the support plate about stud 119 to restore the various elements attached to the mechanism plate to their respective positions shown in FIG. 3. Hence, the reel drive system is again adjusted to its threading and projection mode of operation, the film gate is closed, and the trigger lever and the support plate are again latched in fixed relation to one another. By virtue of the profile of cam lobe 58, these functions are accomplished before either the stripper finger or the drive belt engages the film roll to commence the stripping and threading operation, which then proceeds in the same manner previously described.

In order to allow any selected portion of the film to be rewound and reviewed, review handle 18 is removably attached to the outer end of shaft 125 extending through slot 141 in cover plate 16 (FIG. 2), and is rotatably immovable relative to that shaft. When this handle is moved manually in a clockwise direction during the projection phase of the projector's operation, it pivots the interlock lever to the position shown in FIG. 9 in opposition to the influence of spring 123 but does not disturb the position of the support plate or the trigger lever 115. Such movement of the interlock lever causes cam surface 133 thereof to allow the horizontal end portion of shifter rod 129 to move downwardly so that the reel drive system is thereby shifted temporarily into its rewind mode of operation. Just before such shifting occurs, the arcuate movement of the end of finger 126 of the interlock member along cam surface 128 of the gate opening lever causes the latter to be displaced to open the gate in the manner previously described. As soon as the review handle is released, however, the interlock lever and the gate opening lever are returned immediately to their former positions by spring 123; thus, shifting the reel drive system back to its former mode of operation and then closing the film gate so that the projection operation is restored.

When the review handle is thus employed to initiate rewinding of the film, the resulting shifting of the reel drive mechanism into its rewind mode of operation may produce momentary tensioning of the film due to the winding momentum of the takeup reel. Similarly, after the desired length of film has been rewound, the shifting of the reel drive system back to its projection mode of operation may likewise produce momentary tension in the film due to the rewinding momentum of the takeup reel. Accordingly, to prevent trigger lever 115 from releasing support plate 118 in response to the occurrence of such momentary film tensioning, the upper end of interlock lever 124 is provided with an arcuate blocking surface 142 which moves below pin 143 on the snubber member to obstruct downward movement of that member whenever the reset handle is moved manually to effect rewinding of the film. As described above with regard to the function of pin 88 on cam follower member 61, relatively strong resilient means could be employed in cooperation with surface 142 and pin 143 to allow limited downward movement of the snubber member during the rewind operation; thereby allowing the snubber member to prevent violent jerking of the film but preventing it from operating trigger lever 115.

If handle member 18 should be moved accidentally to the position shown in FIG. 9 while the threading operation is in progress, malfunctioning of the projector obviously would occur as a consequence of the resulting opening of the film gate and shifting of the film drive system to its rewind mode of operation. To avoid this occurrence, therefore, shoulder 144 on the interlock lever below cam surface 133 is adapted to abut against the horizontal portion of reset rod 138 preventing that lever from being rotated manually in a clockwise direction about the axis shaft 125 whenever the reset rod is raised to the position which it assumes throughout the stripping and threading operation.

In addition to the various features of the illustrated projector comprising the preferred embodiment of the invention, it will be apparent that means of the type well known in the projector art could be provided to enable the film to be displayed in a reverse direction, at different speeds, or one frame at a time. Furthermore, as previously suggested, it should be apparent that the invention could also be adapted to other types of self-threading equipment such as tape recorders or the like. Additionally, it should also be understood that the various components which are combined in the above-described embodiment of the invention are not limited in novelty or utility to such particular combination but may be employed advantageously in other types of projectors, or related devices, either independently or in various combinations or subcombinations with one another.

The invention has been described in detail with particular reference to a preferred embodiment thereof, but it will be understood that variations and modifications can be effected within the spirit and scope of the invention as described hereinabove and as defined in the appended claims.

I claim:

1. In a motion picture projector or the like including means for rotatably supporting a supply reel upon which may be wound a roll of film having a leading end, a film gate, and means for rotatably supporting a takeup reel adapted to receive film unwound from said supply reel and delivered through said film gate, the improvement comprising:
   a. a threading mechanism adjustable to a condition for separating the leading end of said film from said roll, said mechanism including a manually movable operating member movable between first and second positions to effect corresponding adjustment of said mechanism to said condition in which the leading end of said film on said reel is separated from said roll and delivered from said supply reel,
   b. means for guiding the leading end of said film delivered from said supply reel by said threading mechanism through said film gate to said takeup reel,
   c. a shifter member operably coupled to said means for rotatably supporting said supply and takeup reels, said shifter member being adjustable to a forward position to effect winding rotation of said takeup reel and a reverse position to effect rewinding rotation of said supply reel,
   d. an interlock member engageable with said shifter member, said interlock member being movable between a first location and a second location for moving said shifter member between its forward position and its reverse position, respectively,
   e. resilient means coupled to said interlock member for biasing said interlock member toward said second location,
   f. a movable latch member adapted to operatively latch said interlock member releasably in said first location in opposition to said resilient means,
   g. tension sensing means for releasing said latch member in response to the existence of a predetermined film tension between said supply reel and said gate, thereby allowing said resilient means to move said interlock member from said first location to said second location, and
   h. reset means responsive to manual movement of said operating member from its first to its second position for returning said interlock member to its first location and into operative latched engagement with said latch member.

2. The invention defined by claim 1 wherein:
   a. said latch member includes a pivotally movable support member and a trigger lever having a latch tooth, said support member being resiliently biased toward latching engagement with said latch tooth, and
   b. said interlock member is pivotally mounted on said support member for angular movement relative thereto, spring means angularly biasing said interlock member to a predetermined position relative to said support member, whereby said movement of said interlock member between said first and second locations thereof is effected by pivotal movement of said support member with said interlock member retained resiliently in said predetermined position relative thereto by said spring means.

3. The invention defined by claim 2 including a manually movable member connected to said interlock member to effect pivotal movement thereof relative to said support member and in opposition to said spring means while said support member remains in latching engagement with said latch tooth on said trigger lever, said interlock member being thereby movable to a third location at which said shifter member is adjusted to said reverse position.

4. The invention defined by claim 3 including means for preventing said tension sensing means from releasing said latch member while said operating member is in said second position.

5. The invention defined by claim 3 including means for preventing said tension sensing means from releasing said latch member while said interlock member is in said third location.

6. The invention defined by claim 3 including means for opening said gate in response to movement of said interlock member from said first location to either of said second and third locations.

7. The invention defined by claim 3 including means for blocking manual movement of said interlock member to said third location while said operating member is in said second position.

8. A motion picture projector comprising:
   a. a casing,
   b. means for rotatably supporting a supply roll of film having a leading end,
   c. a film takeup adapted to receive film from the supply roll,
   d. a manually movable operating member extending from said casing,
   e. means responsive to manual movement of said operating member for separating the leading end of said film from the roll,
   f. an interlock member movable between first and second positions,
   g. means responsive to said interlock member being in its first and second positions for effecting film winding rotation of said takeup and film rewinding rotation of said supply roll, respectively,
   h. means for automatically moving the interlock member from its second to its first position in response to operation of said means for separating the leading end of said film from the roll.
   i. resilient means biasing said interlock member toward said second position, and
   j. a movable latch member adapted to operatively latch said interlock member releasably in said first position in opposition to said resilient means and releasable in response to operation of said means for moving the interlock member from its second to its first position.

9. A device for stripping and feeding thin flexible strip material having a leading end from a roll of such material, said device comprising:
   a. means for rotatably supporting the roll,
   b. a finger pivotally mounted for movement about a first axis and movable from a position spaced from the roll into engagement with the roll for directing the leading end of the strip material away from the roll,
   c. a drive member pivotally mounted for movement about a second axis parallel to and spaced from said first axis, said drive member being movable into engagement with the roll from a position spaced from the roll and adapted to rotate the roll in a direction to unwind the strip material therefrom,
   d. means engageable by an operator for manually moving one of said finger and drive member into engagement with the roll, and
   e. mechanical interconnecting means for moving the other of said finger and drive member into engagement with the roll when said moving means moves said one finger or drive member into engagement with said roll, said interconnecting means including (1) an elongated first lever rotatably movable about one of its ends and pivotally connected to said finger at its other end, (2) a second lever connected to said first lever at a point intermediate the ends of said first lever, and (3) cam means on said drive member for moving said first and second levers in response to pivotal movement of said drive member.

10. A device as defined in claim 9 further comprising means associated with said interconnecting means for moving said finger into engagement with the roll before said drive member engages the roll.